(12) United States Patent
Jones et al.

(10) Patent No.: US 6,330,305 B1
(45) Date of Patent: Dec. 11, 2001

(54) SYSTEM AND METHOD FOR LOCATING FAULTY ELEMENTS IN A TELEPHONIC DISTRIBUTION SYSTEM

(75) Inventors: James B. Jones, Aurora; Barry F. Knerr, Wheaton, both of IL (US)

(73) Assignee: Lucent Technologies, Inc., Murray Hill, NJ (US)

( * ) Notice: Subject to any disclaimer, the term of this patent is extended or adjusted under 35 U.S.C. 154(b) by 0 days.

(21) Appl. No.: 09/087,652

(22) Filed: May 30, 1998

(51) Int. Cl.$^7$ ....................................... H04M 1/24
(52) U.S. Cl. ................ 379/14.01; 379/1; 379/15.05; 348/192; 370/346
(58) Field of Search ................... 379/1, 22, 24, 379/26, 27, 29, 4, 9–10, 14–15, 25, 28, 34; 348/6, 7, 12, 13, 192, 193; 370/347, 346, 350; 375/224, 228, 250

(56) References Cited

U.S. PATENT DOCUMENTS

| | | | |
|---|---|---|---|
| 5,329,308 | * | 7/1994 | Binns et al. ............................ 348/14 |
| 5,475,732 | * | 12/1995 | Pester, III .............................. 379/34 |
| 5,699,402 | * | 12/1997 | Bauer et al. ........................... 379/26 |
| 5,774,992 | * | 2/1999 | Caporizzo ............................ 348/192 |
| 5,835,580 | * | 11/1998 | Fraser .................................. 379/115 |
| 5,854,824 | * | 12/1998 | Bengal et al. ......................... 379/34 |
| 5,886,989 | * | 3/1999 | Evans et al. ......................... 370/347 |
| 5,892,535 | * | 4/1999 | Allen et al. ............................. 348/6 |
| 5,946,373 | * | 8/1999 | Harris .................................. 379/26 |

* cited by examiner

*Primary Examiner*—Binh Tieu (57) ABSTRACT

A system and method for determining the location of faults in a telephonic distribution system where each endpoint in the system has an associated verification code. The endpoints are polled and the response is compared to a corresponding verification code in memory. When the response does not match the verification code in memory the result is included in an endpoint map. An analysis is then performed to identify faulty elements in the system which are reported with their geographical location coordinates.

48 Claims, 6 Drawing Sheets

SYSTEM AND METHOD FOR LOCATING FAULTY ELEMENTS IN A TELEPHONIC DISTRIBUTION SYSTEM

BACKGROUND OF THE INVENTION

This invention pertains to a system and method for locating faulty elements in a telephonic distribution system.

Telephonic distribution systems continue to expand at a rapid rate and increasingly the designs of such systems are hierarchical with many subtended branches. Such systems are used for transmitting combined video and telephone signals via a fiber/coaxial cable and are connected to system elements such as launch amplifiers, extender amplifiers, bridge amplifiers, tap amplifiers and customer premise equipment. Such a system is disclosed in "Combining Apples and Oranges, The Fiber/Coax Network: parts 1–4, Telephony, Jan. 24, 1994, Feb. 7, 1994, Feb. 21, 1994 and Mar., 7, 1994, "Hybrid Fiber-Coax Access Networks" Bell Labs Technical Journal Volume 1, Number 1, Summer 1996 and "Generic Requirements and Objectives for Fiber in the Loop Systems" Bell Communications Research Inc., Technical Reference TRNWT-000909, the disclosures of which are incorporated by reference.

Existing tests and procedures for locating faults in a telephonic distribution system are run at off-hours, typically between 12:00 a.m. and 2:00 a.m., when call activity in the telephonic distribution system is at a minimum. In addition to the disadvantage of running the test at off-hours, certain tests, e.g. a channel and drop test, require that the line connection at customer premise equipment (CPE) be disconnected resulting in the disconnection of service to the customer while the test is being conducted.

A CPE is equipment located at the end customer. The channel and drop test only determines whether a fault exists in the CPE or in the telephone network upstream of the CPE. To locate a fault using the channel and drop test, an analysis is performed beginning at the customer premise equipment (CPE) and working back toward a central office to find the location of the fault. This results in potential lost revenue and other problems associated with discontinuity of service to the customer. Accordingly, the channel and drop test is not suited for repetitive operation during business hours.

Furthermore, tests such as the channel and drop test provide less meaningful information for the locations of faults when used on telephonic distribution systems having a hierarchical design with numerous subtending branches because the identity of an upstream element causing the fault is not easily discerned in such telephonic distribution systems. Upstream elements are upstream of the CPE and downstream from the central office.

The present invention is directed to overcoming, or at least reducing, the effects of one or more of the problems set forth above.

SUMMARY OF THE INVENTION

A system and method is provided in accordance with the invention for determining the location of a faulty element in a telephonic distribution system having a plurality of endpoint elements. The invention provides an endpoint verification code for each of the plurality of endpoint elements, a memory verification code corresponding to the endpoint verification code for a selected one of the plurality of endpoint elements, polling of a selected endpoint element for the endpoint verification code, and comparing the endpoint verification code from the selected endpoint element with the corresponding memory verification code for the selected endpoint element.

Another aspect of the invention provides for analyzing the indication of endpoint element performance to determine which of the endpoint elements are faulty and for automatically creating an endpoint map of the system having individual representations of the plurality of endpoint elements together with a fault indication at the individual representation of each endpoint element determined to be faulty.

In another aspect of the invention, a plurality of endpoint elements are interconnected through different ones of a plurality of upstream elements and performance information about the endpoint elements obtained through the plurality of upstream elements is automatically analyzed for indications that any of the upstream elements are faulty. A faulty endpoint indication is automatically analyzed to determine whether any of the upstream elements are faulty.

In yet another aspect of the invention a report is generated identifying faulty elements and corresponding location coordinates.

These and other features and advantages of the present invention will become apparent from the following detailed description, the accompanying drawings and the appended claims.

DETAILED DESCRIPTION

Figure 1A:
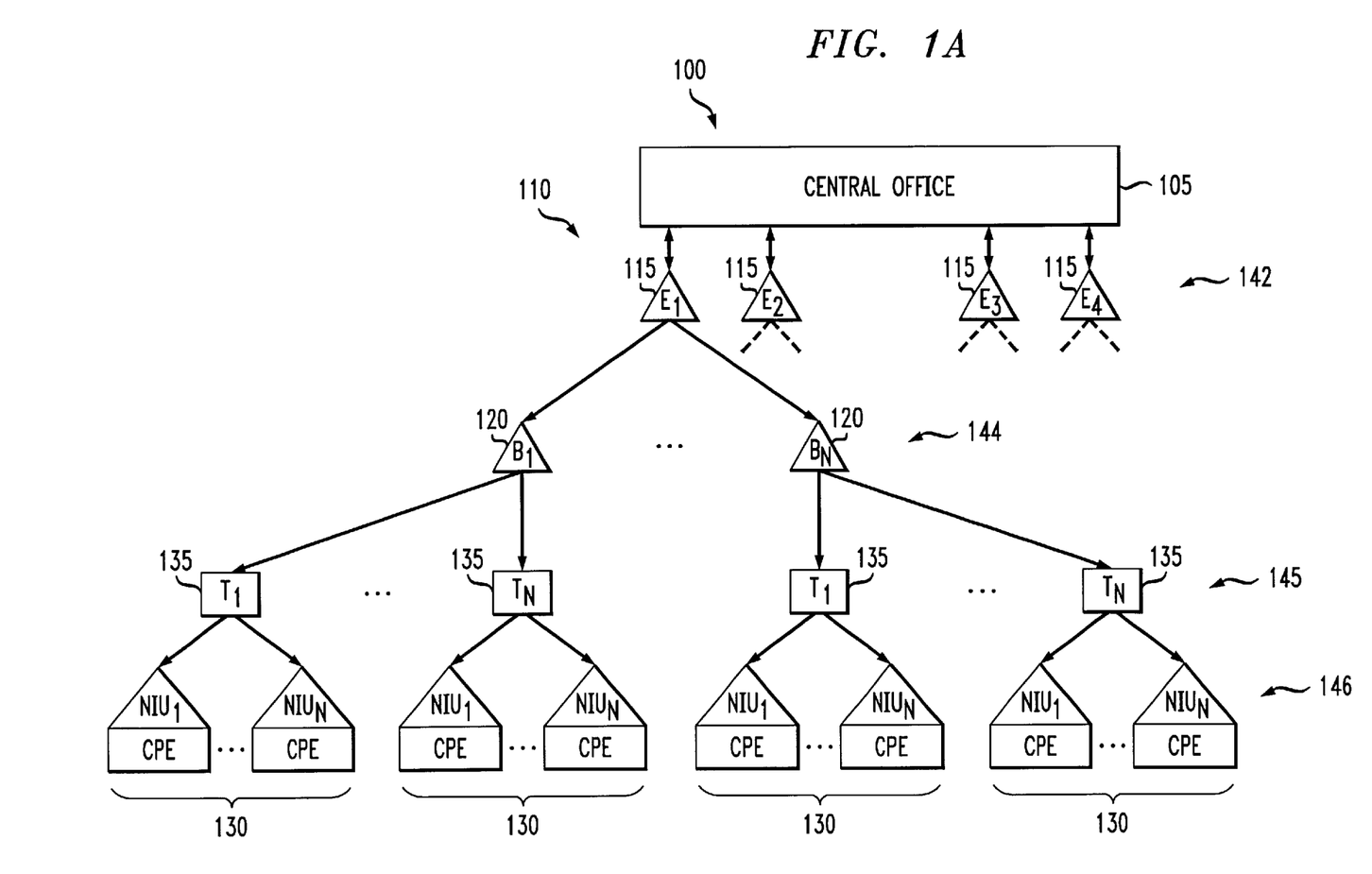
FIG. 1A is a functional block diagram of an embodiment in accordance with the invention.

A system 100 for locating faults in accordance with the invention comprising central office 105 is shown in FIG. 1A. The system 100 further comprises a telephonic/video telephonic distribution system 110.

The telephonic distribution system 110 includes upstream elements: extender amps (E) 115, bridge amps (B) 120 and tap amps (T) 125. The telephonic distribution system 110 also includes endpoint elements that are network interface units (NIUs) 130 associated with a CPE of the system 110. A network interface unit is equipment that typically resides, or is located proximately, on the customer premise equipment that serves as the termination point of a telephonic network and acts as a physical interface between the network and the customer premise equipment.

The four extender amps 115 form a launch amp group (LG) 142; the bridge amps 120 comprise an extender amp group (EG) 144; the tap amps 135 form a bridge amp group (BG) 145; and the NIU 130 form a tap amp group (TG) 146. The telephonic distribution system of FIG. 1A has a plurality of branches depending from every launch amp, extender amp, bridge amp, and tap amp.

For the sake of clarity and brevity, representative subtending branches which are downstream from the central office 105 are shown only with one of the extender amps ($E_1$) 115. In a typical telephonic distribution system, each of the extender amps $E_2$, $E_3$, $E_4$, will have a plurality of subtending branches which are not shown.

Figure 1B:
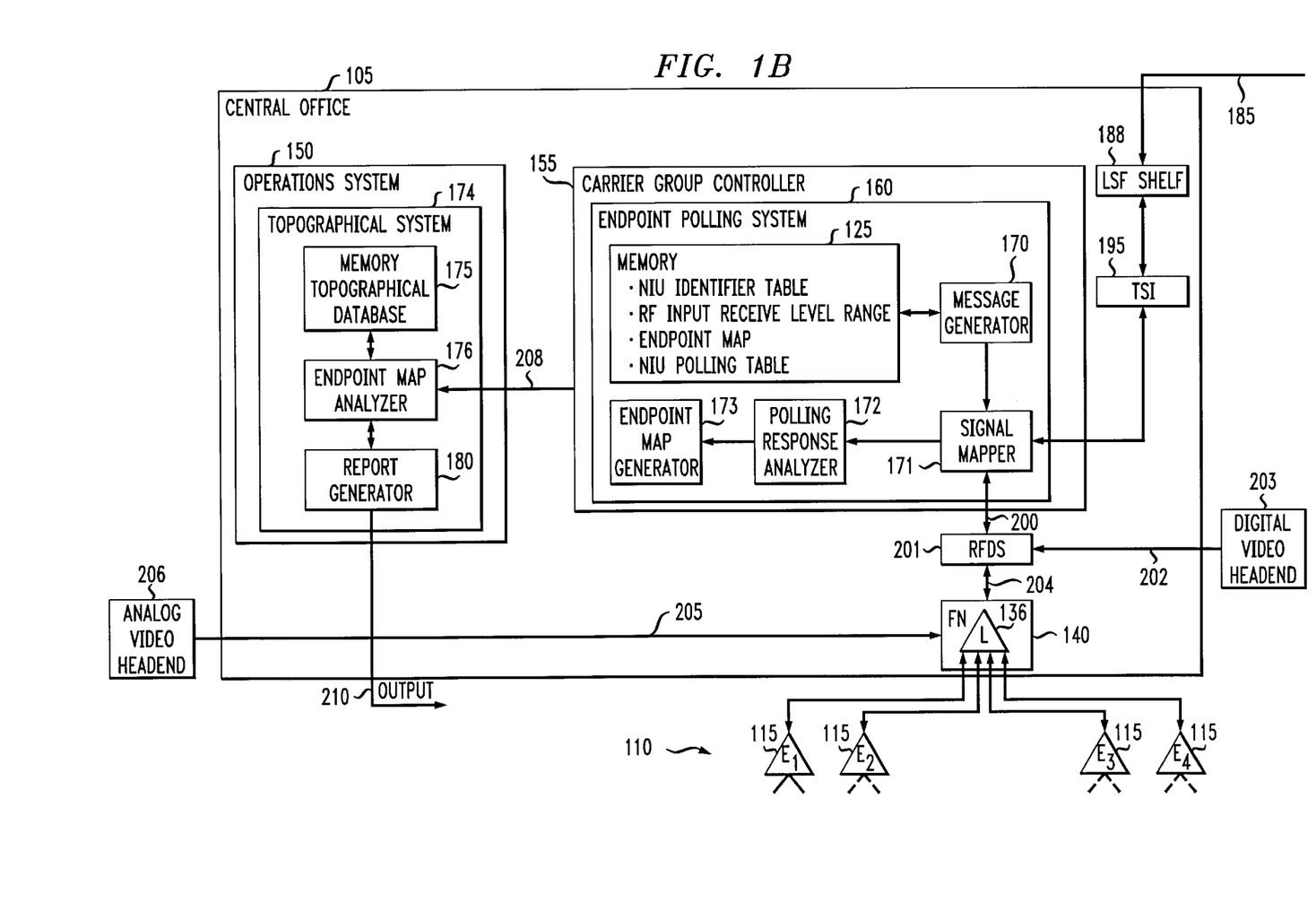
FIG. 1B is a more detailed functional block diagram of a portion of FIG. 1.

Referring to FIG. 1B, the telephonic distribution system 100 further includes a launch amplifier (L) 136 residing in a fiber node (FN) 140. While the launch amplifier (L) 136 and fiber node (FN) 140 are shown residing in the central office 105 they are alternatively located external of the central office 105.

Further referring to FIG. 1B, the system 100 includes an operating system 150 and a carrier group controller 155 residing in the central office 105.

Carrier group controller 155 comprises endpoint polling system 160 which includes a memory 125, a message generator 170, a signal mapper 171, a polling response analyzer 172, and an endpoint map generator 173.

Operations system 150 comprises topographical system 174 which includes a memory 175 having a topographical database, endpoint map analyzer 176 and a report generator 180.

The central office 105 receives a digital telephone signal 185 which is inputted to a low speed feeder (LSF) shelf 188 then through a time slot interchange (TSI) 195 and then inputted to the carrier group controller 155. The LSF is a circuit card that handles a 1.544 Mbps digital signal connection between a host digital terminal (HDT) (not shown) and a local digital switch (not shown). The TSI performs bandwidth management. Referring to both FIGS. 1A and 1B, the memory 125 contains, for every NIU 130, a NIU identifier and a RF input receive level range which comprise a memory verification code. Alternatively, an optical input receive level range is used. Also stored in the memory 125 are an endpoint map identifying a NIU 130 within the system 110, and a NIU polling table identifying the sequence in which the NIUs are polled. The NIU identifier includes a common language equipment identifier (CLEI) code associated with each NIU 130 to be polled. The CLEI is a sequence of twelve digits and letters that uniquely identify an item of equipment. In this application each NIU 130 is associated with a specific CPE.

The endpoint polling system 160 determines which NIU 130 is to be polled by referring to the input polling table in the memory 125. The message generator 170 constructs a digital polling message to send to the NIU 130. The operation of the system 100 begins with the construction of an endpoint polling message by the message generator 170 which includes the endpoint address for the polled NIU 130. The polling message requests a verification code from the polled NIU 130, specifically the CLEI code and the RF input receive level associated with the NIU 130.

The signal mapper 171 of the endpoint polling system 160 combines the digital telephone signal 185 with the digital polling message to form two narrow band channel signals which are transmitted by signal link 200 to a radio frequency distribution shelf (RFDS) 201. The RFDS is responsible for digital to RF conversion downstream, i.e., signals transmitted from the central office 105 to the system 110, and RF to digital conversion upstream, i.e., signals received by central office 105 from the system 110, and for RF frequency bandwidth control. A digital video signal or link 202, such as high definition TV (HDTV) if present, is outputted from a digital video headend 203 and received by the RFDS 201 which combines broad band signal channels associated with the digital video signal or link 202 and converts the resulting signal to RF which is then transmitted via a signal link 204 to the fiber node 140. An analog video signal or link 205, such as cable TV (CATV) if present, is transmitted from an analog headend 206 and received by the fiber node 140 where it is combined with RF signal from the RFDS 201 and then broadcast by the launch amplifier 136 of the fiber node 140 over the coaxial/fiber cable functioning as a shared bus of the telephonic distribution system 110.

When a NIU 130 receives a polling message requesting its endpoint element verification code, a reply is prepared which includes the identifier CLEI code and the RF receive input level of the polled NIU 130. The capacity of the NIU 130 to respond to the polling resides in a processor (not shown) in the NIU 130. The processor receives the polling message and a polling response is searched by a message generator (not shown) at the NIU 130. The polling response is constructed including the NIU CLEI code from a memory of the NIU 130 as an identifier and a RF receive input level which is measured by the NIU at the time the polling message is received. The polling response is returned to the polling response analyzer 172 via the signal mapper 171 and connection 207 of the endpoint polling system 160.

The response to the polling is received in a preselected time period. The polling response analyzer 172 of the endpoint polling system 160 processes the polling response by comparing the NIU 130 identifier and RF receive input level included in the polling response with the memory verification code and receiving input levels in the memory 125 for the polled NIU 130. If the polling response matches the NIU identifier table, and the RF input receive level range is within the range in the memory 125 for the polled NIU 130, the endpoint map (not shown) is marked good in the memory 125 for the polled endpoint element. If there is no response within the preselected time period or if either the identifier code is not valid or if the RF receive input level is not within a specified range, the endpoint map is marked bad for the polled endpoint element.

Upon completion of the polling cycle of the telephonic distribution system 110 preferably performed within approximately ten minutes, an endpoint map is generated by the endpoint map generator 173 in response to the output from response analyzer 172 and transmitted over an internal message bus 208 to the endpoint map analyzer 176 of the topographical system 174 of the operations system 150. The endpoint map includes the status of all NIUs 130 for all endpoint elements, CPE(s), namely, (a) good or no response to polling, (b) good or bad wrong RF input level response, or (c) good or bad CLEI code response. The endpoint map preferably includes placeholders, which is a location in a memory for the upstream elements 125, 120, 115 and 135 of the telephonic distribution system 110.

The topographical system 174 performs a hierarchical analysis using the endpoint map generated by the endpoint polling system 160. The endpoint map includes the NIU 130 the last polling cycle of the endpoints in the telephonic distribution system 110. The endpoint map analyzer 176 determines the common endpoint fault point(s) within the NIU fault patterns reflected in the endpoint map. A faulty upstream element is determined by a hierarchical analysis which examines the endpoint element NIUs 130 to determine the identity of the faulty element(s) causing the fault in the telephonic distribution system 110. The placeholders are marked bad for faulty upstream elements.

For an example of the hierarchical analysis, refer to FIGS. 1A and 1B. If only one NIU 130 reports bad under tap amp (T),135 then that one NIU 130 is the faulty endpoint element in the telephonic distribution system 110. If all NIUs 130 report bad under tap amp ($T_1$) 135 and the NIUs 130 under tap amp ($T_2 - T_N$) 135 report good, then the faulty upstream element is tap amp ($T_1$) 135. However, if all NIUs 130 report bad under tap amps ($T_1$) 135 and tap amps ($T_2 - T_N$) 135 then the associated faulty upstream element is bridge amp ($B_1$) 120. Further, if it is determined that the bridge amp ($B_1$) 120 and ($B_2 - B_N$) 120 report bad, then extender amp ($E_1$) 115 is the faulty upstream element. If upon further analysis, it is determined that all extender amps, ($E_1$) 115, ($E_2$) 115, ($E_3$) 115, and ($E_4$) 115 report bad, then the faulty upstream element is the launch amp (L) 135.

When more than one but less than all subtending elements under an upstream element report bad, the system 100 determines that the fault is likely caused by equipment such as cables and connections associated with the subtending elements and the associated upstream element. Thus, an indication of the location of such problems is provided in accordance with the invention. For example, if more than one but less than all NIUs 130 report bad under tamp amp ($T_1$) 135, then the tap amp ($T_1$) 135 is good and other equipment such as cables and connectors subtending from the tap amp ($T_1$) 135 is the source of the fault.

Upon completion of the hierarchical analysis, a report is generated including the identity of all bad reporting NIUs 130 along with the basis of the bad report as described herein; e.g. no response, bad CLEI code or bad RF input receive level. The report preferably includes the identity of the faulty element(s), endpoint NIUs and/or upstream elements, and geographical location coordinates for all bad reporting or faulty NIUs and faulty upstream elements. The geographical location coordinates are obtained from the topographical database in the memory 175. Referring to FIG. 1B, the report generator 180 has an output 210, and the information of the output is then displayed in a preselected format such as an array, for example, at a computer terminal or a printer, or the like.

Figure 2A:
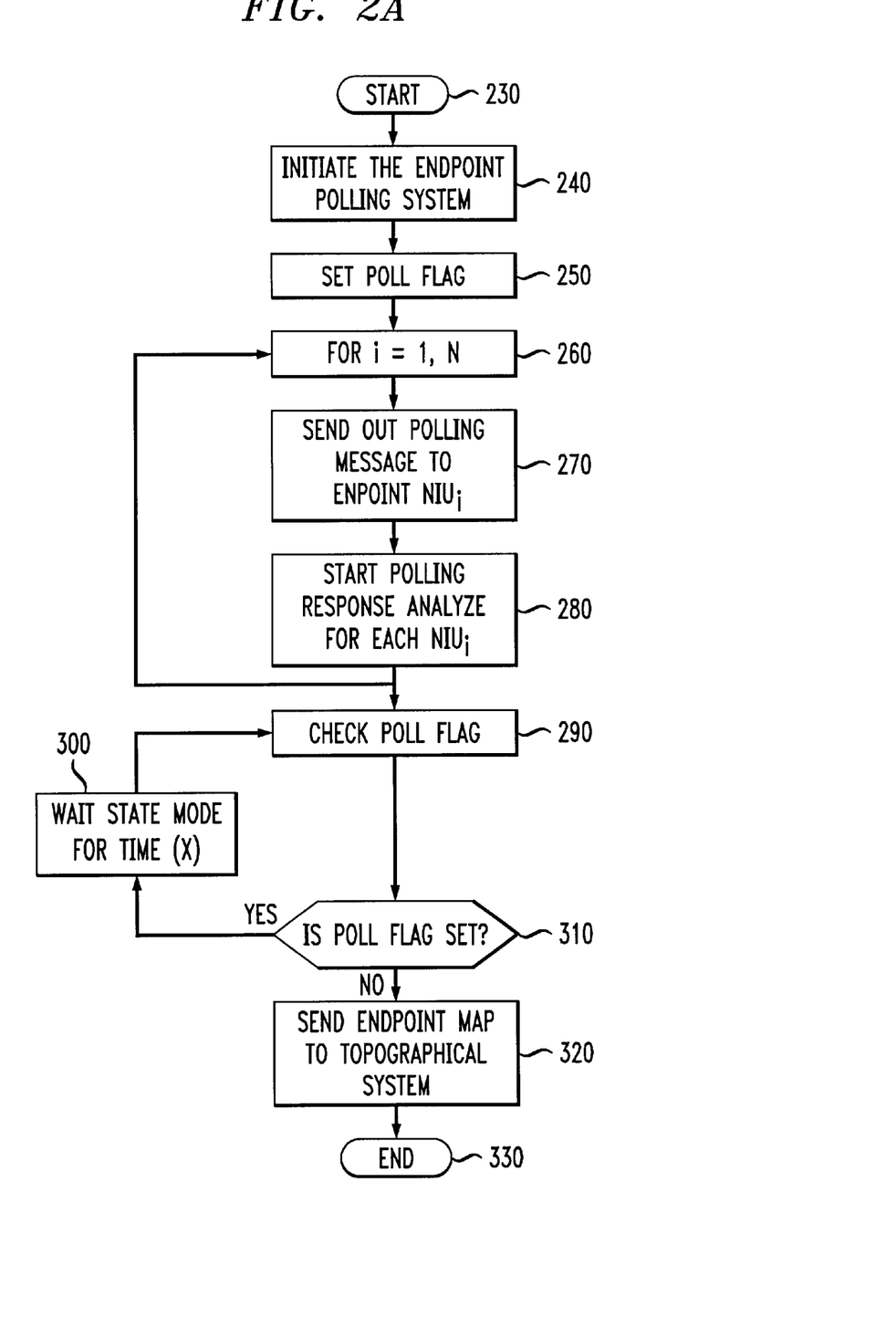
FIG. 2A is a flow chart showing an endpoint polling method in accordance with the invention.

FIG. 2A shows the method for the endpoint polling system in accordance with the invention. The method starts at step 230, and at step 240 the endpoint polling method is initiated. In particular, at step 250, a poll flag is set which indicates that polling is in progress. At steps 260, 270, and 280 all endpoints i=1, N are polled where i is the current NIU polled and N is the total number of NIUs. At step 270, the polling message is sent to each endpoint $NIU_i$. At step 280, the polling response of each $NIU_i$ is initiated, as described in FIG. 2B, for endpoint $NIU_i$. The method then continues to step 290 and completes the process for i=1, N.

In step 290, the pole flag is checked to determine if polling is in progress. At step 310 if the pole flag is set then not all messages have been received or timed out. If the pole flag is not set, then all messages have been received and the method proceeds to step 320, and the endpoint map is sent to the topographical system 115. The method then ends at step 330.

Referring back to step 290, if the end pole flag is still set, the method proceeds to step 300 and enters a wait state for an arbitrary time X. The method repeats the loop beginning at step 290 until the poll flag is not set. The method proceeds to step 320, and the endpoint map is sent to the topographical system 115 and processed by a method described below. The method then ends at step 330.

Figure 2B:
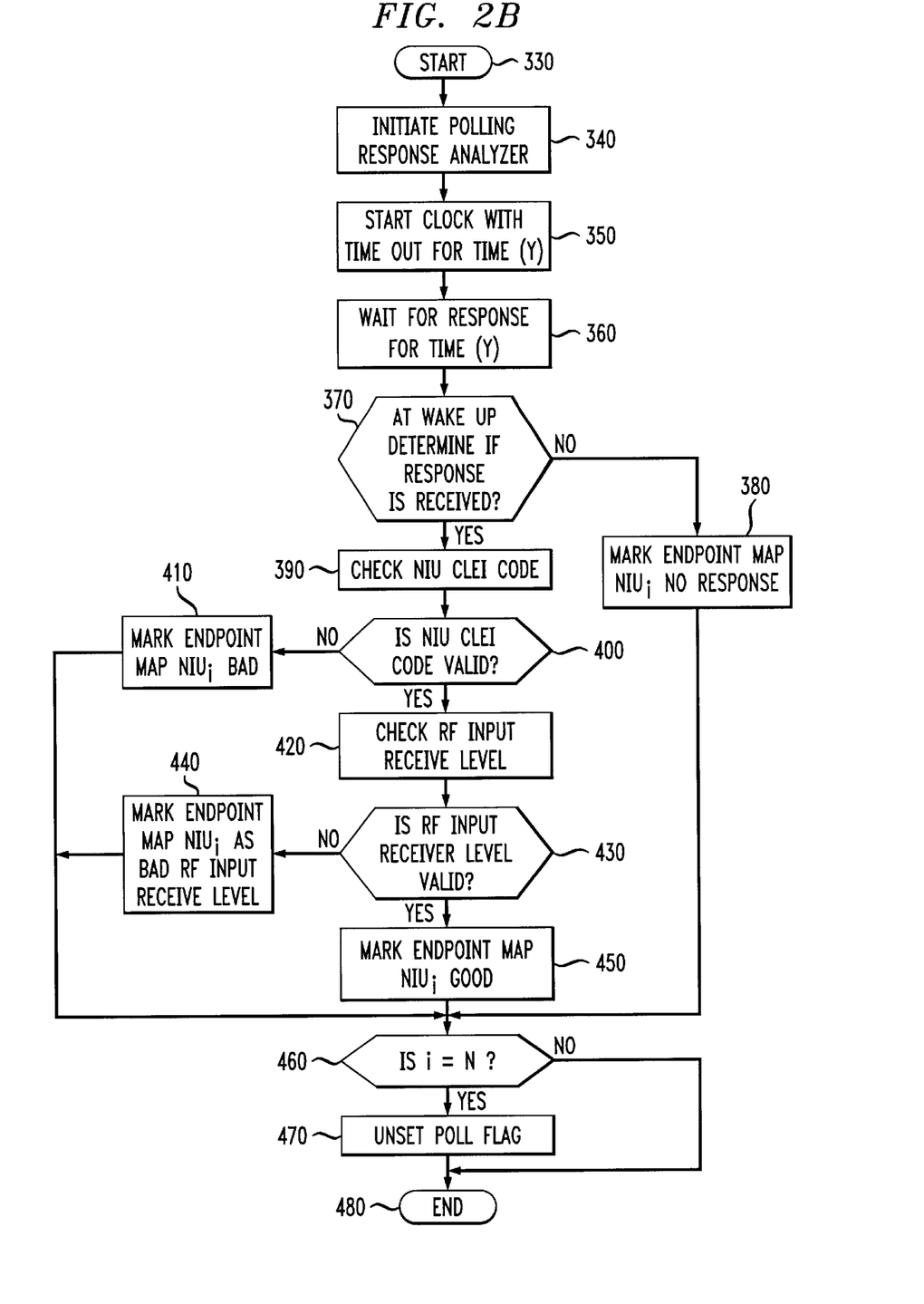
FIG. 2B is a flow chart of a method of analyzing the responses from the network of FIG. 2A.

FIG. 2B is a flow chart for a method for analyzing the polling response of step 280 in FIG. 2A in accordance with the invention. The method starts at step 330 and at step 340 the method for analyzing the polling response is initiated.

At step 350, a clock is started with time-out set for an arbitrary time Y. In step 360, the method waits for an arbitrary time Y, and in step 370 it is determined at wake up if a response was received. The wake up is either a response or a time-out. If the wake up is a response, then the method proceeds to step 390 where the NIU/CLEI code is checked. If the wake up is a time-out and not a response, then the method proceeds to step 380 where the endpoint map NIUi is marked bad for no response, and the method proceeds to step 460.

In step 400, if the NIU/CLEI code is valid, then the method proceeds to step 420, where the RF input receive level is checked. If the NIU/CLEI code is not valid, then the method proceeds to step 410, where the endpoint map entry for NIUi is marked bad indicating that the response was invalid and the method proceeds to step 460.

At step 430, it is determined if the RF input receive level is valid, and if valid, the method proceeds to step 450 where the endpoint map entry for $NIU_i$ is marked good and the method proceeds to step 460. If the RF input received level is not valid, then the method proceeds to step 440 where the endpoint $NIU_i$ is marked as a bad RF input received level and the method proceeds to step 460.

At step 460, if i equals N, where i is the current NIU being polled and N is the total number of NIUs polled, then at step 470 the poll flag is unset, and the method ends at step 480. If i is not equal to N, then the method ends at step 480. The unsetting of the pole flag corresponds to the sending of the endpoint map to the topographical process at step 320 in the method for the end point polling system of FIG. 2A.

Figure 3A:
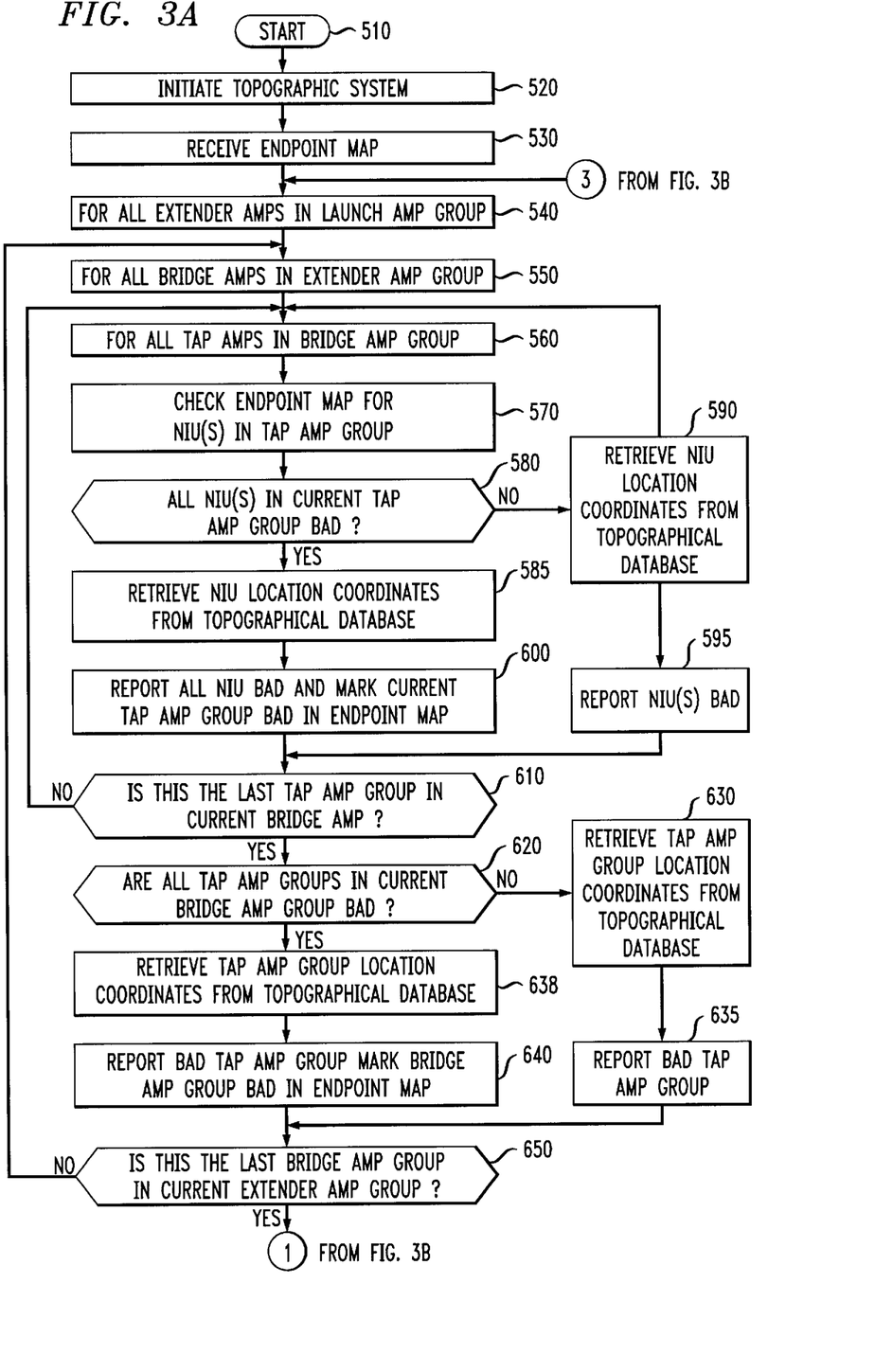
FIGS. 3A and 3B are a flow chart of a method of topographical system in accordance with the invention.
Figure 3B:
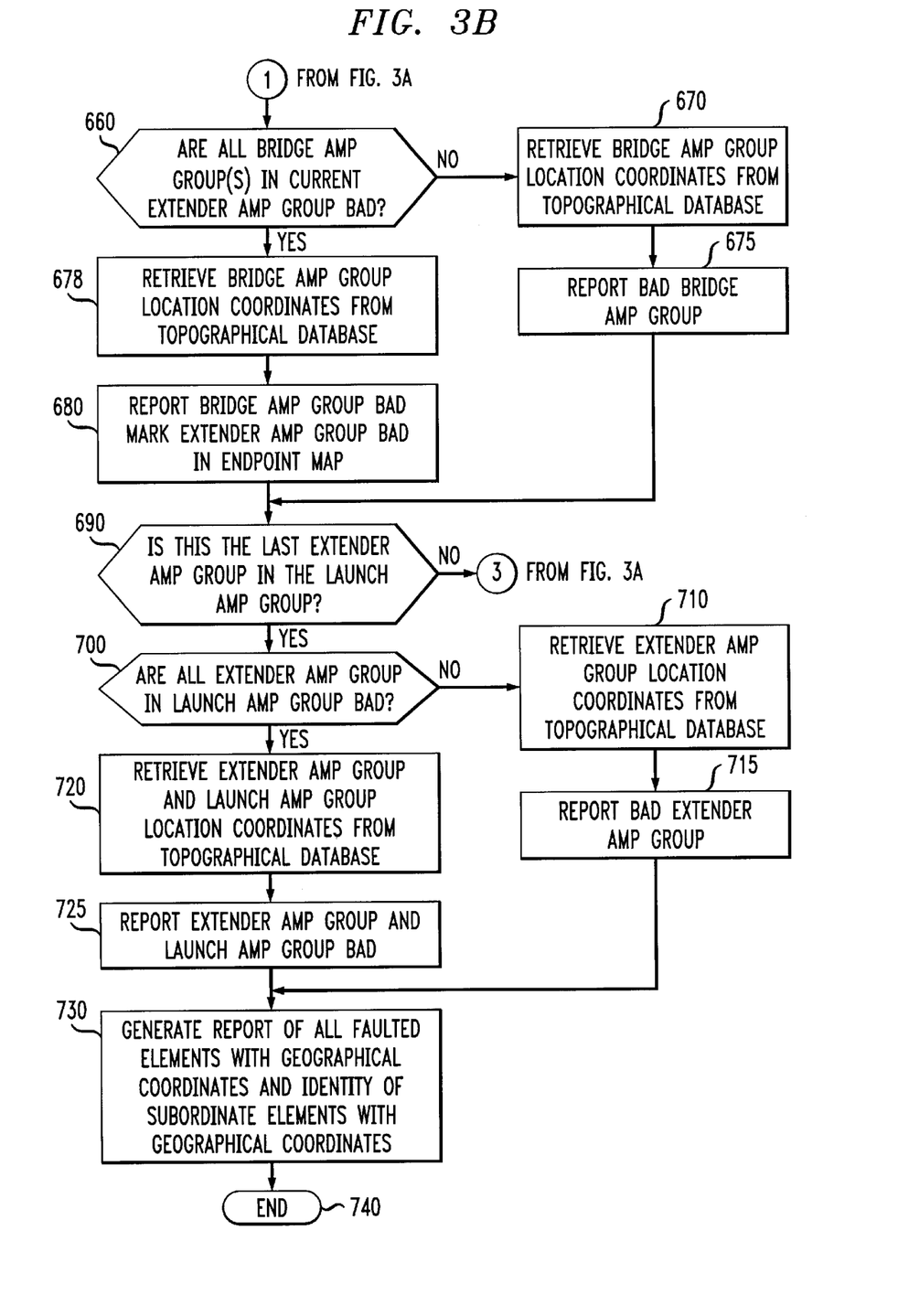

In FIGS. 3A and 3B, a flow chart of the topographical system 115 is shown. The method begins at step 510, and at step 520 the topographical system is initiated. At step 530 the endpoint map is received at the endpoint map analyzer 176.

Step 540, for each extender amp (E) 115 in the launch amp group (LG) 142, step 550 for each bridge amp (B) 120 in the current extender amp group (EG) 144, and step 560 for each tap amp (T) 125 in the current bridge group (BG) 145, and at step 570 for each NIU 130 in the current tap amp group (TG) 146 are "for" loops or an iterative process that determines the status of an element by analyzing the status of its subtending elements. The subsequent steps of the method are performed for each respective launch amp group (LG) 142, extender amp group (EG) 144, bridge amp group (B) 120 and tap amp group (T) 125.

At step 580, if all NIUs in the current TG are bad then at step 585 coordinate locations, preferably map coordinates, are retrieved from the topographical database in memory 175, then at step 600 all NIUs are reported bad, and the current TG is marked bad in the endpoint map. If every NIU is not bad, then the geographical coordinates for the bad NIUs are retrieved from the topographical database of memory 175, at step 590 and each bad NIU is reported bad at step 595.

At step 610, it is determined whether if this is the last TG in the current BG. If it is not the last TG, then the method returns to step 560. If it is the last TG then the method proceeds to step 620 where it is determined whether all the TGs in the current BG are bad. If yes, the method proceeds to step 638 to retrieve coordinates from the topographical database of memory 175 for the TG. At step 640 the BG is marked bad in the endpoint map and all the subtending TG are reported bad. If the TGs are not all bad then at step 630 the coordinates are retrieved the topographical database of memory 175, and at step 635 the bad TG are reported bad.

At step 650 it is determined whether this is the last BG in the EG. If not, the method returns to step 550 to go through all the TG for the next BG and all the subsequent NIUs for the TG. If yes, then the method proceeds to step 660. If at step 660, all the BG in the EG are bad, then the method proceeds to step 678 to retrieve coordinates for the BG from topographical database of memory 175, and at step 680 the EG is marked bad and reports all the subtending BG bad. If not, then at step 670 the coordinates for the bad BG are retrieved from the topographical database of memory 175, and at step 675, the bad BG are reported bad.

The method then proceeds to step 690 where it is determined if this is the last EG in the LG. If not, then the method proceeds to step 540 where the next EG is checked along with the corresponding BG and TG and NIUs in accordance with the method beginning at step 540. If it is the last EG, then the method proceeds to step 700, and if all EG in the LG are bad, then at step 720 the location coordinates for EG and LG are retrieved from the topographical database of memory 175, and at step 725 the EG and LG are reported bad. If not, then at step 710 the location coordinates are retrieved for the EG from the topographical database of memory 175, and at step 715 the bad EG are reported and the method proceeds to step 730.

After step 725, the method proceeds to step 730 and the report generator 180 (see FIG. 1B) then generates a report identifying the bad elements in the telephonic distribution system 110 and the faulty element(s) causing the bad responses of subordinate elements. The method then ends at step 740.

Those skilled in the art who now have the benefit of the present disclosure will appreciate that the present invention may take many forms and embodiments. For example, the LSF shelf 188, TSI 195, carrier group controller 160 and components residing thereon, RFDS 201, FN 135, L 135 are elements of a host digital terminal (HDT) and alternatively located remote of the central office in accordance with the invention. The HDT consists of the hardware typically co-located at the central office used to provide the telephony interface to the local digital switch. In our system this unit also facilitates video and data interfaces. Furthermore, while the invention is described in a telephonic distribution system having a hierarchical fiber/coaxial design, the invention is applicable to other telephonic distribution systems. The embodiments presented are to provide an understanding of the invention. These embodiments are illustrative, and not limiting to the present invention. Rather, it is intended that the invention cover all modifications, equivalents and alternatives falling within the scope of the invention as defined by the appended claims.

What is claimed is:

1. In a telephonic call distribution system, a method comprising the steps of:
    providing each of a plurality of endpoint elements having an endpoint element verification code;
    storing in a memory a memory verification code corresponding to the endpoint element verification code of each of the plurality of endpoint elements;
    polling the endpoint elements for a provision of an endpoint element verification code;
    polling the endpoint element for an indication of endpoint element performance;
    automatically creating an endpoint map of the system having a representation of the performance of the plurality of endpoint elements; and
    employing the endpoint map to perform a hierarchical analysis for determination of one or more faulty elements of the system.

2. The method of claim 1 including the step of storing one of an absence and a presence of the endpoint element verification codes of the polled endpoint elements.

3. The method of claim 1 wherein the endpoint element verification code and the memory verification code is a common language equipment identifier code associated with each of the endpoint elements.

4. The method of claim 1 wherein the endpoint element verification code and the memory verification code is an input receive level associated with each of the endpoint elements.

5. In a telephonic distribution system, a system comprising:
    a plurality of endpoint elements with each of the endpoint elements having an endpoint element verification code;
    a memory verification code corresponding to the endpoint element verification code of each of the plurality of endpoint elements;
    a message generator for polling the endpoint elements for a provision of a verification code;
    an endpoint map generator for generating an endpoint element map having an identity of each endpoint element of the plurality of endpoint elements when the endpoint element verification code does not match the corresponding memory verification code; and
    an endpoint map analyzer for employing the endpoint element map to perform a hierarchical analysis for determination of one or more faulty elements of the system.

6. The system of claim 5 including a polling response analyzer for analyzing a response to the polling of the endpoint elements for a provision of an endpoint element verification code.

7. The system of claim 6 wherein the polling response analyzer compares the endpoint element verification code obtained from each of the endpoint elements during polling with the corresponding memory verification code.

8. The system of claim 6 including means for storing one of an absence and a presence of the endpoint element verification codes of the polled endpoint elements.

9. The system of claim 5 wherein endpoint element verification code and the memory verification code is a common language equipment identifier code associated with each of the endpoint elements.

10. The system of claim 5 wherein the endpoint element verification code and the memory verification code is an endpoint receive level for each of the endpoint elements.

11. In a telephonic distribution system having a plurality of endpoint elements, a method of determining locations of faults in the system, comprising the steps of:
    polling the endpoint elements for an indication of endpoint element performance;
    automatically analyzing the indication of endpoint element performance to determine which of the endpoint elements are faulty; and
    automatically creating an endpoint map of the system having individual representations of the plurality of endpoint elements together with a fault indication at the individual representation of each endpoint element determined to be faulty;
    wherein the step of automatically analyzing the indication of endpoint element performance and the step of automatically creating the endpoint map comprise the step of:
    employing the endpoint map to perform a hierarchical analysis for determination of one or more faulty elements of the system.

12. The method of claim 11 wherein the indication of faulty endpoint elements includes at least one of a nonresponse to polling in a preselected time period, an invalid common language equipment identifier code, and an invalid receive input level.

13. In a telephonic distribution system having a plurality of endpoint elements, a system of determining locations of faults in the system, the system comprising:
   a message generator for polling the endpoint elements for an indication of endpoint element performance;
   a polling response analyzer for analyzing the indication of endpoint element performance to determine which of the endpoint elements are faulty;
   an endpoint map generator for automatically creating an endpoint map of the system having individual representations of the plurality of endpoint elements together with a fault indication at the individual representation of each endpoint element determined to be faulty; and
   an endpoint map analyzer for employing the endpoint map to perform a hierarchical analysis for determination of one or more faulty elements of the system.

14. The system of claim 13 wherein the indication of faulty endpoint elements includes at least one of a nonresponse to polling in a preselected time period, an invalid common language equipment identifier code, and an invalid receive input level.

15. In a telephonic distribution system have a plurality of endpoint elements interconnected through different ones of a plurality of upstream elements a method of determining locations of faults in the system, comprising the steps of:
   automatically analyzing performance information about the endpoint elements obtained through the plurality of upstream elements for indications that any of the upstream elements are faulty;
   automatically analyzing any faulty endpoint indications to determine whether any of the upstream elements are faulty; and
   wherein the step of automatically analyzing performance information about the endpoint elements and the step of automatically analyzing any faulty endpoint indications comprise the step of:
      employing an endpoint map to perform a hierarchical analysis for determination of one or more faulty elements of the system.

16. The method of claim 15 wherein faulty upstream elements have faulty subtending endpoint elements.

17. In a telephonic distribution system have a plurality of endpoint elements interconnected through different ones of a plurality of upstream elements, a system of determining locations of faults in the system, the system comprising:
   an endpoint map analyzer automatically analyzing any faulty endpoint indications to determine whether any of the upstream elements are faulty; and
   wherein the endpoint map analyzer is employable for automatically analyzing performance information about the endpoint elements obtained through the plurality of upstream elements for indications that any of the upstream elements are faulty;
   wherein the endpoint map analyzer employs an endpoint map to perform a hierarchical analysis for determination of one or more faulty elements of the system.

18. The system of claim 17 wherein faulty upstream elements have faulty subtending endpoint elements.

19. In a telephonic distribution system, a method for determining locations of faults in the system, comprising the steps of:
   determining the identity of faulty elements in the telephonic distribution system through performance of a hierarchical analysis that employs an endpoint map; and
   automatically associating the faulty elements with corresponding element locations.

20. The method of claim 19 wherein the locations are expressed as location coordinates.

21. The method of claim 19 including the step of generating a report including the faulty elements and location coordinates.

22. The method of claim 20 wherein the report includes the identity and status of endpoint elements used in determining the faulty elements.

23. In a telephonic distribution system, a system for determining locations of faults, the system, the system comprising:
   an endpoint map analyzer for determining the identity of faulty elements in the telephonic distribution system through performance of a hierarchical analysis that employs an endpoint map; and
   means for automatically associating the faulty elements with corresponding location coordinates in a topographical database.

24. The system of claim 23 wherein the locations are expressed as geographical coordinates.

25. The system of claim 23 including a report generator for generating a report including the faulty elements and location coordinates.

26. The system of claim 25 wherein the report includes the identity and status of endpoint elements used in determining the faulty elements.

27. In a telephonic distribution system having a plurality of endpoint elements, a method comprising the steps of:
   establishing an endpoint element verification code for each of the plurality of endpoint elements;
   establishing a memory verification code corresponding to the endpoint element verification code of each of the plurality of endpoint elements;
   polling of the plurality of endpoint elements for the endpoint element verification code for each endpoint element of the plurality of endpoint elements;
   comparing the endpoint element verification code obtained from each endpoint element during polling with the corresponding memory verification code;
   polling the endpoint element for an indication of endpoint element performance;
   automatically creating an endpoint map of the system having a representation of the performance of the plurality of endpoint elements; and
   employing the endpoint map to perform a hierarchical analysis for determination of one or more faulty elements of the system.

28. In a telephonic distribution system having a plurality of endpoint elements, a method comprising the steps of:
   establishing an endpoint element verification code for each of the plurality of endpoint elements;
   establishing a memory verification code corresponding to the endpoint element verification code of each of the plurality of endpoint elements;
   polling of the plurality of endpoint elements for the endpoint element verification code for each endpoint element of the plurality of endpoint elements;
   comparing the endpoint element verification code obtained from each endpoint element during polling with the corresponding memory verification code;
   constructing a polling message for the each of the endpoint elements;
   constructing a plurality signals including at least one telephone signal and one video signal, and transmitting the polling message together with at least one of the plurality of signals via the telephonic distribution system to a selected one endpoint element.

29. The method of claim 28 wherein the step of transmitting includes the step of allocating to each of the polling message and the plurality of signals an assigned portion of bandwidth in the transmission to each one endpoint element.

30. The method of claim 27 including the step of determining if each endpoint element is faulty, and wherein the endpoint element is faulty if the polling response includes at least one of a nonresponse to polling within a preselected time period, and invalid common language equipment identifier code, and an invalid input receive level.

31. The method of claim 27 wherein the memory verification code is a common language equipment identifier code associated with each endpoint element.

32. The method of claim 27 wherein the memory verification code is an input receive level associated with each endpoint element.

33. The method of claim 27 including the steps of determining if the endpoint element verification code from each endpoint element matches the corresponding memory verification code;

selecting the endpoint map to comprise an endpoint element map having an identity of each endpoint element of the plurality of endpoint elements; and generating the endpoint element map when the endpoint element verification code does not match the corresponding memory verification code.

34. The method of claim 33 wherein the endpoint element map includes the identity of each endpoint element of the plurality of endpoint elements having an endpoint element verification codes not matching an associated memory verification code.

35. The method of claim 34 including the step of establishing in the telephonic distribution system a hierarchical design having a plurality of subtended branches with each outermost branch of the branches having an outer end connected to one of the plurality of endpoint elements.

36. The method of claim 35 including the steps of establishing a upstream element connecting subtended branches, identifying the upstream elements in the endpoint element map, and analyzing the non-matching plurality of endpoint elements to ascertain faulty elements among the plurality of endpoint elements and the upstream elements.

37. The method of claim 36 including the steps of generating a report of the faulty elements, and identifying the geographical location coordinates of each faulty element.

38. The method of claim 37 wherein the step of generating a report include the step of identifying the endpoint elements and associated geographical location coordinates.

39. In a telephonic distribution system having a plurality of endpoint elements, a system for determining the location of faults in the system, the system comprising:

means for establishing an endpoint element verification code for each of the plurality endpoint elements;

a memory for storing a memory verification code corresponding to the endpoint element verification code of each of the plurality of endpoint elements;

a message generator constructing a message for polling each of the plurality of endpoint elements for the endpoint element verification code for each endpoint element of the plurality of endpoint elements;

a polling response analyzer for comparing the endpoint element verification code obtained from each endpoint element during polling with the corresponding memory verification code;

means for generating a plurality of signals, including at least one telephone signal and one video signal and at least one of the plurality of signals being transmitted with the polling message as an output signal via the telephonic distribution system to the each endpoint element; and an endpoint map analyzer for employing an endpoint map to perform a hierarchical analysis for determination of one or more faulty elements of the system.

40. The system of claim 39 including a launch amplifier for transmitting each of the polling message and at least one the plurality of signals in an assigned portion of bandwidth of the output signal to each endpoint element.

41. The system of claim 39 wherein the memory verification code defines a common language equipment identifier code associated with each endpoint element.

42. The system of claim 39 wherein the memory verification code is an input receive level associated with each endpoint element.

43. The system of claim 39 including a polling response analyzer to determine if the endpoint element verification code from the at least one of the plurality of endpoint elements matches the corresponding memory verification code, and an endpoint element map generator for generating an endpoint element map having the identity of each of the plurality of endpoint elements when the endpoint element verification code does not match the corresponding memory verification code.

44. The system of claim 43 wherein the telephonic distribution system is a hierarchical design having a plurality of subtended branches with each outermost branch of the branches having an outer end connected to one of the plurality of endpoint elements.

45. The system of claim 44 wherein the telephonic distribution system has an upstream element connecting subtended branches, and wherein the endpoint map analyzer is employable for analyzing the non-matching plurality of endpoint elements to ascertain faulty elements among the endpoint elements and the upstream elements.

46. The system of claim 45 including a report generator for generating a report of faulty elements and location coordinates associated with each faulty element.

47. The system of claim 46 including a topographical database having geographical location coordinated for the elements, and wherein the report includes the geographical location coordinates for each faulty element.

48. The system of claim 46 wherein the report includes at least one of a plurality of endpoint elements having a verification code not matching a corresponding memory verification code.

* * * * *